H. J. HICK.
EQUALIZING RETAINER FOR TIRE CHAINS.
APPLICATION FILED MAR. 11, 1919.
1,335,165.
Patented Mar. 30, 1920.
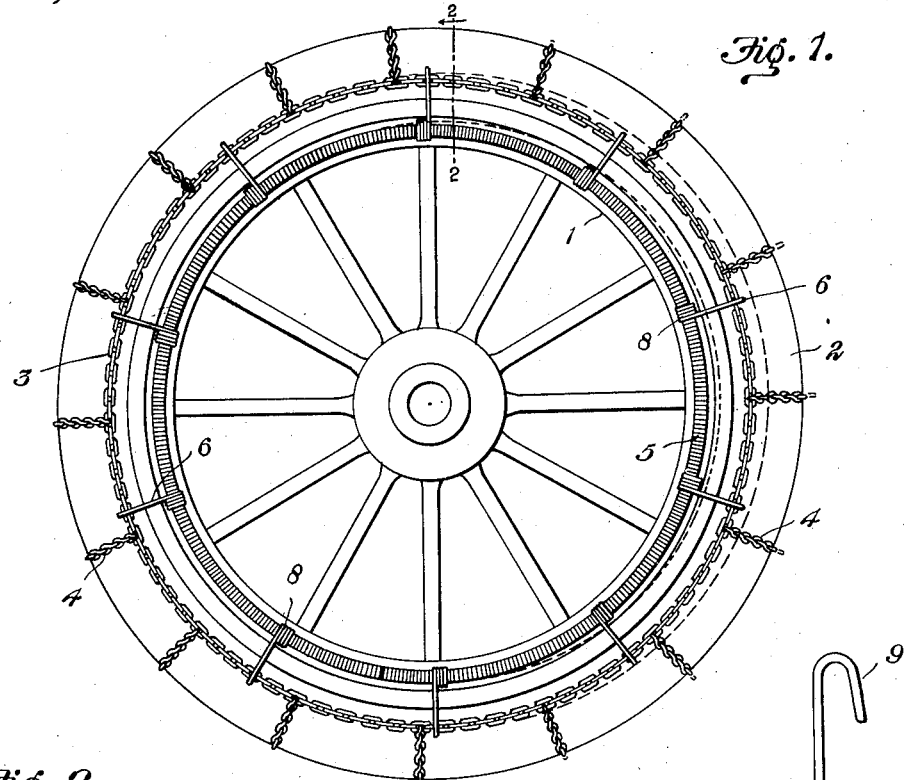
Fig. 1.
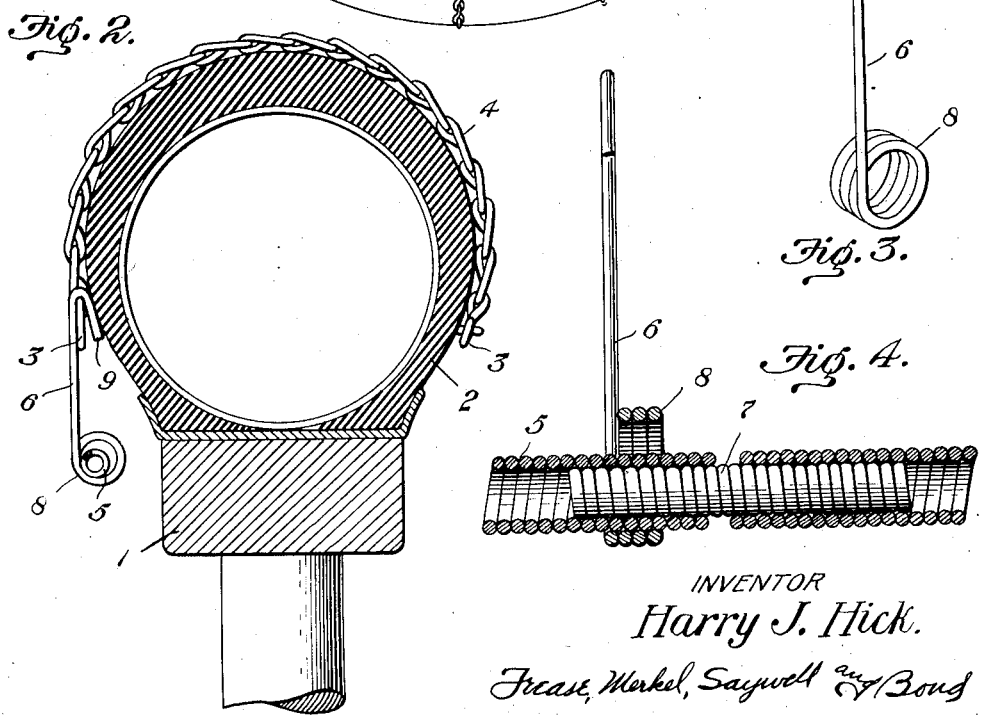
Fig. 2.
Fig. 3.
Fig. 4.
INVENTOR
Harry J. Hick.
Frease, Merkel, Saywell and Bond
ATTORNEYS

UNITED STATES PATENT OFFICE.

HARRY JOSEPH HICK, OF ALLIANCE, OHIO.

EQUALIZING-RETAINER FOR TIRE-CHAINS.

1,335,165.

Specification of Letters Patent.   Patented Mar. 30, 1920.

Application filed March 11, 1919.  Serial No. 281,972.

*To all whom it may concern:*

Be it known that I, HARRY J. HICK, a citizen of the United States, residing at Alliance, in the county of Stark and State of Ohio, have invented a certain new and useful Equalizing-Retainer for Tire-Chains, of which the following is a specification.

The invention relates to an equalizing retainer for automobile tire chains of the Weed type, which have a creeping movement around the periphery of the tire as the wheel rotates in traveling along a road; and the objects of the improvement are to provide a retainer which can be readily applied to the inner as well as to the outer side of the wheel; which will prevent a loss of the chain when the same is broken or becomes unfastened; and which will uniformly restrain an excessive centrifugal throw of the chain without preventing a creeping or circumferential movement thereof with reference to the tire.

These objects of the invention, and other ancillary advantages are attained by providing a ring resilient throughout its length of slightly less diameter than the chain rings, and connecting the same with one of the chain rings by means of a multiplicity of short links slidably mounted upon the resilient ring.

The invention thus set forth in general terms is illustrated in the accompanying drawings forming part hereof, in which—

Figure 1 is a side elevation of an automobile wheel showing a chain equipped with the equalizing retainer;

Fig. 2, an enlarged section on line 2—2, Fig. 1;

Fig. 3, a detached perspective view of one of the connecting links; and

Fig. 4, a fragmentary section of the resilient ring joint, and showing one of the links.

Similar numerals refer to similar parts throughout the drawing.

Upon the rim 1 of the automobile wheel is mounted a pneumatic tire 2, upon which is shown an anti-skid chain of ordinary construction comprising the parallel ring chains or annuli 3 alongside of the tire connected at intervals by the cross chains 4 extending around the tread face of the tire.

The equalizing retainer comprises a resilient ring 5 and the radial links 6. The resilient ring 5 is slightly less in diameter than the side chains, and may be formed of spring wire coiled into a long helix with its extremities connected to each other in such a manner as to render it elastic throughout its length. This may be done by providing a coiled spring wire nipple 7, upon which the ends of the long helix are screwed after being reversely twisted so as to be in normal relation when screwed upon the nipple.

A multiplicity of the radial links 6, preferably more than four thereof, are slidably engaged upon the resilient ring 5, and may have their inner ends coiled, as shown at 8, to form an eye of sufficient size to permit a free sliding movement along the resilient ring. The outer ends of the links are provided with hooks 9 which are engaged with one of the ring chains for connecting the same at spaced intervals with the resilient ring, the tension upon the chain being equalized throughout its length because of the comparatively short distance between the adjacent links.

The resilient ring 5 is preferably located so as to be opposite and adjacent to the rim of the wheel, and the links preferably have their engaging eyes and hooks turned inward toward the wheel so that these parts will not protrude to strike the sides of deep ruts or other obstacles alongside the wheel; and it is obvious that the location of the retaining means adjacent to the rim of the wheel, reduces materially the advancing movement of the links when near the treading portion of the wheel, as compared with the much greater advancing movement of links extending further upward toward the center of the wheel, thus largely avoiding an interference between the retaining means and such obstacles.

By locating the resilient ring inside of and adjacent to the chain ring, and connecting the two rings together at frequent intervals, a sufficient tension is placed upon the tire chain to prevent an excessive centrifugal throw thereof at any point; but this tension is not localized or positive enough at any one point to prevent the necessary centrifugal throw of the chain to give it the desired creeping movement circumferentially along the tire. And the sliding engagement of the links with the resilient ring, permits the chain to creep or move locally, as well as bodily thereon, and also upon the tire, thus giving the resilient ring a floating character with reference to the chains as well as with reference to the tire and the wheel.

Furthermore, the multiplicity of links connecting the resilient ring with the chain ring, permits a retaining ring to be employed of less tensile strength, as compared with the resilient members of retaining means having a relatively few, as for instance four or less, number of points of engagement with the chain ring; with the resulting advantage that the tension of the retaining means at the several points of connection with the chain ring, is not sufficient or positive enough to prevent a free centrifugal throw and circumferential movement of the cross chains at or adjacent to such point of connection. The equalized or uniform throw of the chain is shown by broken lines in Fig. 1.

It is obvious that the retainer may be applied to the outer side of a wheel by merely hooking the links to the chain ring, and that it may likewise be applied to the inner side of a wheel by stretching and slipping it over the tire of the wheel, and in the latter event the retainer will hold the chain upon the axle, in case it leaves the wheel. And finally a retainer can be used on either side of the wheel, but its use on the outer side thereof will generally be sufficient for practical purposes.

Although the drawings and description herein disclose the best mode in which I have contemplated embodying my invention, the same is not limited to the details of such disclosure, for in the further practical application of the invention, many changes in form and construction may be made within the scope of the claims, as circumstances require or experience suggests, without departing from the spirit of the invention.

I claim:

1. The combination of tread chains across and annuli alongside a wheel tire with a resilient ring inside of one of the annuli and adjacent to the rim of the wheel, and a multiplicity of links connecting the ring with the same annulus.

2. An equalizing retainer for wheel tire chains having an annulus alongside the tire, comprising a resilient ring inside of the annulus and adjacent to the rim of the wheel, and a multiplicity of links connected with the annulus and slidably engaged on the ring.

3. The combination of tread chains across and annuli alongside a wheel tire with a resilient ring inside of one of the annuli and adjacent to the rim of the wheel, and a multiplicity of links connected with the same annulus and slidably engaged on the ring.

4. An equalizing retainer for wheel tire chains having an annulus alongside the tire comprising a spring coil ring inside of the annulus and adjacent to the rim of the wheel, and a multiplicity of links connected with the annulus and slidably engaged on the ring.

5. The combination of tread chains across and annuli alongside a wheel tire with a spring coil ring inside one of the annuli and adjacent to the rim of the wheel, and a multiplicity of links connected with the same annulus and slidably engaged on the ring.

HARRY JOSEPH HICK.